(12) United States Patent
Hirose

(10) Patent No.: US 7,551,373 B2
(45) Date of Patent: *Jun. 23, 2009

(54) IMAGE PICKUP OPTICAL SYSTEM

(75) Inventor: Masatoshi Hirose, Toyohashi (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/527,889

(22) Filed: Sep. 27, 2006

(65) Prior Publication Data

US 2007/0076308 A1 Apr. 5, 2007

(30) Foreign Application Priority Data

Oct. 5, 2005 (JP) .............................. 2005-292091

(51) Int. Cl.
G02B 9/34 (2006.01)
(52) U.S. Cl. ...................... 359/781; 359/747; 359/764; 359/770; 359/771
(58) Field of Classification Search ................. 359/753, 359/747, 734, 714–715, 682, 659–660, 781, 359/764, 770–771

See application file for complete search history.

(56) References Cited

U.S. PATENT DOCUMENTS

| | | | | |
|---|---|---|---|---|
| 4,113,358 A * | 9/1978 | Nakagawa | .................. | 359/753 |
| 4,235,521 A * | 11/1980 | Imai | ........................... | 359/766 |
| 4,323,302 A * | 4/1982 | Kimura | ....................... | 359/682 |
| 5,317,451 A * | 5/1994 | Hasushita | .................... | 359/643 |
| 6,757,109 B2 * | 6/2004 | Bos | ............................. | 359/753 |
| 7,280,289 B2 * | 10/2007 | Yamakawa | ................... | 359/771 |
| 7,375,906 B2 * | 5/2008 | Hirose et al. | ................ | 359/749 |

FOREIGN PATENT DOCUMENTS

| | | | |
|---|---|---|---|
| JP | 2-13916 | A | 1/1990 |
| JP | 7-49449 | A | 2/1995 |
| JP | 2000-221391 | A | 8/2000 |
| JP | 2003-307674 | A | 10/2003 |
| JP | 2005-227426 | A | 8/2005 |

OTHER PUBLICATIONS

European Search Report dated Dec. 29, 2006, for counterpart European Application No. EP 06 02 07772 with Communication/Minutes.
S. Brownstein, "Tashenbuch der Mathematick", Harri Deutch Verlag, XP002411624, 1984, (1 page).

* cited by examiner

Primary Examiner—Ricky L Mack
Assistant Examiner—James R Greece
(74) Attorney, Agent, or Firm—Sidley Austin LLP

(57) ABSTRACT

An image pickup optical system for forming a light flux from an object into an optical image on an image pickup element, is provided with, in order from an object side thereof: a first lens with a negative power in a meniscus shape including a convex surface facing the object side; a second lens in a bioconcave shape; a third lens with a positive power including a convex surface facing an image surface side; and a fourth lens with a positive power including a convex surface facing the image surface side. The first lens and the third lens are glass lenses and the second lens and the fourth lens are plastic lenses.

4 Claims, 4 Drawing Sheets

IMAGE PICKUP OPTICAL SYSTEM

This application is based on Japanese Patent Application No. 2005-292091 filed on Oct. 5, 2005, in Japanese Patent Office, the entire content of which is hereby incorporated by reference.

TECHNICAL FIELD

The present invention relates to an image pickup optical system capable of leading light to an image pickup element, particularly to an image pickup optical system with a wide angle of view including a plastic lens.

BACKGROUND

In a surveillance camera or onboard camera, an image pickup optical system having a wide angle of view is employed to get a wide image pickup range with one camera. The image pickup optical system having a wide angle of view has been disclosed in several proposals. For example, a system having an angle of view of about 150 degrees has been proposed, as disclosed in Japanese Non-Examined Patent Publication Nos. 2003-307674 and 2005-227426.

However, the optical system described in Japanese Non-Examined Patent Publication 2003-307674 requires use of many lenses. This results in a cost increase and difficult lens assembling. Further, the optical system described in Japanese Non-Examined Patent Publication 2005-227426 is not suitable for use in a surveillance camera or onboard camera which is employed in an environment affected by great temperature fluctuation.

SUMMARY

An object of the present invention is to solve the aforementioned problems and to provide a compact and inexpensive image pickup optical system with a wide angle of view and excellent performances providing a small change in the position of image formed under wide-ranging temperature conditions.

A structure according to the present invention is an image pickup optical system provided with, in order from an object side thereof: a first lens with a negative power in a meniscus shape including a convex surface facing the object side; a second lens in a biconcave shape; a third lens with a positive power including a convex surface facing an image surface side; and a fourth lens with a positive power including a convex surface facing the image surface side. The first lens and the third lens are glass lenses and the second lens and the fourth lens are plastic lenses. This structure provides a wide angle of view, compact configuration and reduced production cost, minimizes a change in the position of the image formed under widely changing temperature conditions and suppresses the deterioration of lens performances.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DESCRIPTION OF THE PREFERRED EMBODIMENT

Figure 1:
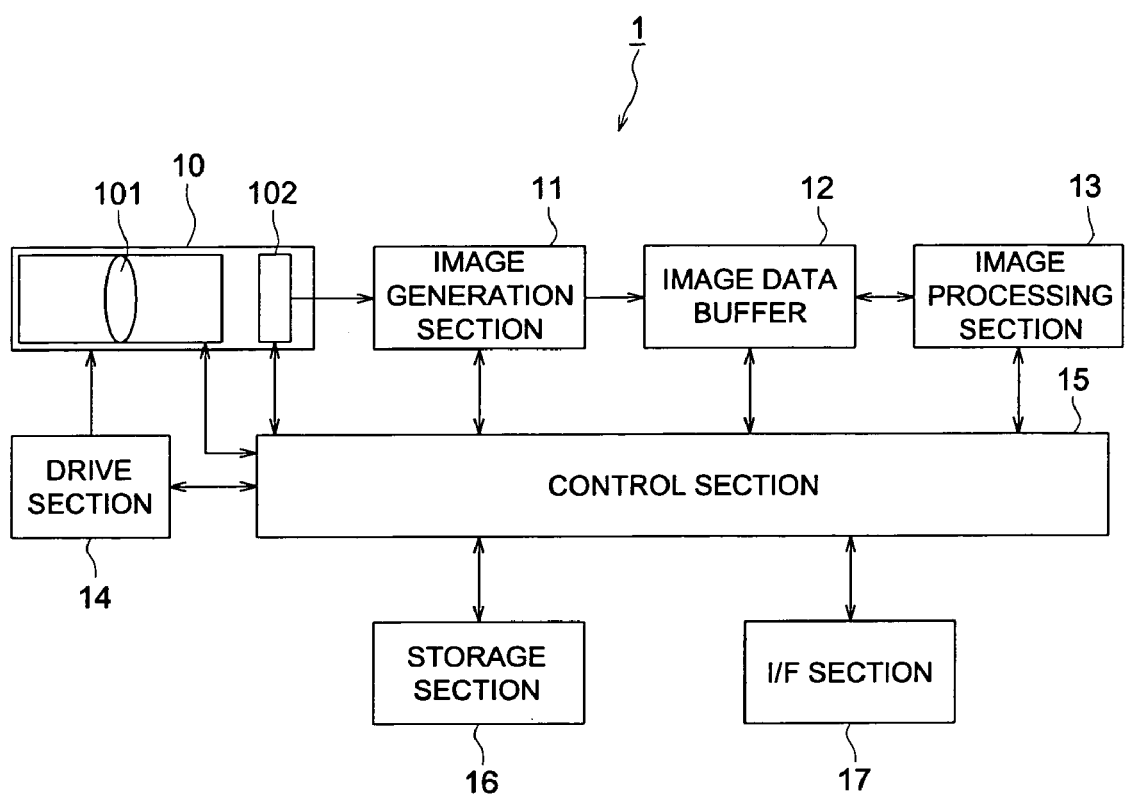
FIG. 1 is a block diagram representing the structure of an onboard camera of each embodiment according to the present invention.

The following describes embodiments according to the present invention with reference to drawings. FIG. 1 is a function block diagram representing the structure of an onboard camera provided with an image pickup optical system according to the present invention. In FIG. 1, the onboard camera 1 contains an image pickup apparatus 10, image generation section 11, image data buffer 12, image processing section 13, drive section 14, control section 15, storage section 16 and I/F section 17.

The image pickup apparatus 10 is provided with a lens drive apparatus (not illustrated) for driving an image pickup optical system 101 and image pickup element 102. The image pickup optical system 101 forms a light flux from a photographic object into an image on an image pickup surface of the image pickup element 102 to form an optical image of the photographic object.

The image generation section 11 generates image data for each pixel from the image signal of the image pickup element 102, and the image data is outputted to the image data buffer 12. The image data buffer 12 is a memory for temporary storage of image data and provides a working area for processing the image data by means of the image processing section 13. The drive section 14 drives the optical axis of the onboard camera 1, for example, in the lateral direction (direction of panning) or vertical direction (direction of tilting), and in the focusing direction in response to the control signal outputted from the control section 15. The storage section 16 is a storage circuit to store various programs required for the operation of the onboard camera 1 and the data generated during execution of the program. The I/F section 17 is an interface for exchanging image data with an external device. The control section 15 controls the image pickup apparatus 10, image generation section 11, image data buffer 12, image processing section 13, drive section 14, storage section 16 and I/F section 17, for example.

The following describes the flow of processing when the onboard camera 1 of the aforementioned structure is used as a back monitor of a car. While observing the monitor installed on the dashboard of the car, the driver backs a car. When the area where the driver wishes to observe is deviated from the area whose image is captured by the onboard camera 1, the driver follows a predetermined operation procedure, for example, by operating the button provided on the dashboard. In response to this operation procedure, the control section 15 controls the drive section 14, and drives the lens drive apparatus of the image pickup apparatus 10 to adjust the direction of the image pickup section 10 and to adjust the focus. This procedure ensures an focused optical image to be formed on the light receiving surface of the image pickup element 102, and is converted into image signal, which is then outputted to the image generation section 11. The image signal is temporarily stored in the image data buffer 12, and is processed by the image processing section 13. In this manner, a natural image of the area where the driver wishes to observe is indicated on the motor installed on the dashboard.

The following describes the structure of the image pickup optical system 101.

Figure 2:
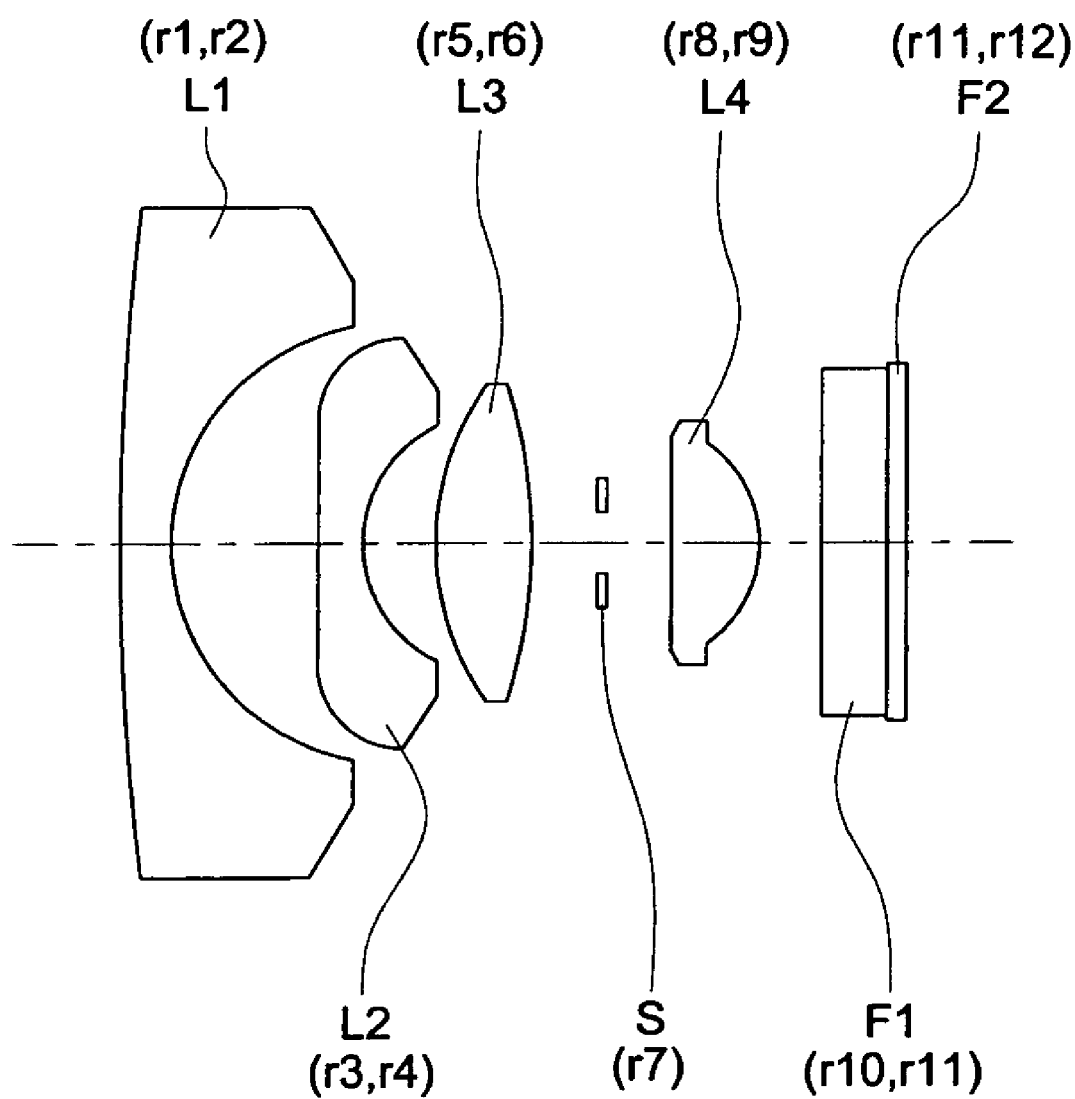
FIG. 2 is a diagram representing the structure of an image pickup optical system as the first embodiment.

FIG. 2 illustrates the first embodiment. The image pickup optical system in FIG. 2 is provided with, in order from the object side of the image pickup optical system: a first lens L1 with negative power in a meniscus shape whose convex surface faces the object side; a second lens L2 with negative power in a biconcave shape whose opposite surfaces are aspherical; a third lens L3 with positive power in a biconvex shape; a stop S; and a fourth lens L4 with positive power in a biconvex shape whose stronger convex surface faces the image surface side and whose opposite surfaces are aspherical.

In the present invention, "power" refers to the quantity defined by the reciprocal of the focal length in the present invention.

Figure 3:
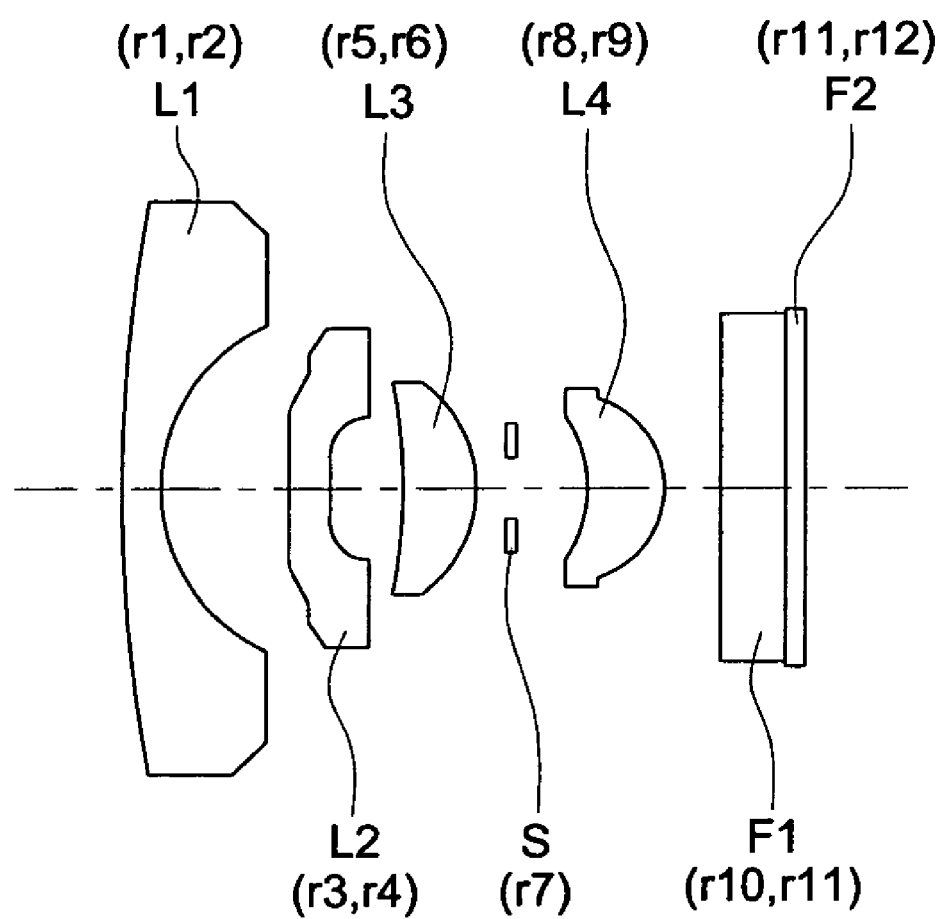
FIG. 3 is a diagram representing the structure of an image pickup optical system as the second embodiment.

FIG. 3 illustrates the second embodiment. The image pickup optical system in FIG. 3 is provided with, in order from the object side of the image pickup optical system: a first lens L1 with negative power in a meniscus shape whose convex surface faces the object side; a second lens L2 with negative power in a biconcave shape whose opposite surfaces are aspherical; a third lens L3 with positive power in a meniscus shape whose convex surface faces the image surface side; a stop S; and a fourth lens L4 in a meniscus shape having positive power whose stronger convex surface faces the image surface and whose opposite surfaces are aspherical.

As in the first and second embodiments, the image pickup optical system includes, in order from the object side of the image pickup optical system: a first lens with negative power in a meniscus shape including a convex surface facing the object side; a second lens in a biconcave shape including at least one aspherical surface; a third lens L3 with positive power including a convex surface facing the image surface side; and a fourth lens L4 with positive power including a convex surface facing the image surface side and including at least one aspherical surface. This structure provides a wide angle of view, and effectively corrects distortion despite the wide angle of view.

The second lens L2 with negative power and the fourth lens L4 with positive power are made of plastics, and each of the lenses L2 and L4 is provided with an aspherical surface. This arrangement brings about a substantial reduction in the number of lenses, hence in production costs, with the result that overall length of the image pickup optical system can be decreased.

When the image pickup optical system is made of plastic lenses, there is a big change in refractive index due to temperature variation and in the variation of the lens configuration. This will cause deviation of the focal point on the image surface. However, in the embodiments of the present invention, the first lens L1 with negative power and the third lens L3 with positive power are glass lenses, while the second lens L2 with negative power and the fourth lens L4 with positive power are plastic lenses. When this structure is used, deviation of the focal point due to temperature variation is offset by the lenses with negative power and those with positive power, whereby the deviation of the focal point on the image surface can be minimized. This arrangement produces an image pickup optical system providing high performances.

Further, the following conditional equation is preferably fulfilled.

$$-2 < f2/f4 < -0.5 \qquad \text{Eq. 1}$$

Where f2 is a focal length of the second lens, and f4 is a focal length of the fourth lens. Equation 1 defines the power of the plastic lens within the adequate range, thereby reducing the deviation of the focal point resulting from temperature variation. If the value of f2/f4 has reduced below the lower limit of the Equation 1, the power of the fourth lens will become excessive. This will bring about a big influence of the deviation of the image surface position due to the temperature variation of the fourth lens L4. If the temperature has risen above the normal temperature, the image surface will be deviated from the normal position toward the image surface. If the temperature has reduced below the normal temperature, the image surface will be deviated from the normal position toward the object whose image is to be captured. Conversely, if the value of f2/f4 has exceeded the upper limit of the Equation 1, the power of the second lens L2 will be excessive. This will bring about a big influence of the deviation of the image surface position due to the temperature variation of the second lens L2. If the temperature has risen above the normal temperature, the image surface will be deviated from the normal position toward the object whose image is to be captured. If the temperature has reduced below the normal temperature, the image surface will be deviated from the normal position toward the image surface, with the result that the lens performances deteriorate.

Further, the following conditional equation is preferably fulfilled.

$$vd3 < 50 \qquad \text{Eq. 2}$$

Where vd3 is the Abbe's constant of the third lens. The Equation 2 defines the Abbe's constant of the third lens within the adequate range, thereby reducing the lateral chromatic aberration. If the upper limit of the vd3 has been exceeded, there will be a serious deterioration in the performances around the image surface due to lateral chromatic aberration.

A stop is preferably provided between the third lens L3 and the fourth lens L4. The balance of various aberrations including field curvature and lateral chromatic aberration can be kept by blocking unwanted light reaching the image surface at a position between the third lens L3 and the fourth lens L4, whereby lens performances are improved.

Further, the following conditional expression is preferably fulfilled.

$$-0.5 < f/f2 < -0.1 \qquad \text{Eq. 3}$$

Where f is a focal length of the entire system, and f2 is the focal length of the second lens. Equation 3 defines the power of the second lens L2 within the adequate range, thereby ensuring the amount of light around the image surface and reducing distortion. If the f/f2 is reduced below the lower limit, the power of the second lens L2 will be excessive. This will cause a serious deterioration of distortion, and makes it difficult to correct the aberration. Conversely, if the f/f2 has exceeded the upper limit, the power of the second lens L2 will be insufficient. The exit pupil position will come close to the image surface and the incident angle of light to the periphery of the image surface will be increased, with the result that the amount of light around the image surface is reduced.

Further, the following conditional equation is preferably fulfilled.

$$2\omega > 140 \qquad \text{Eq. 4}$$

Where $2\omega$ is the angle of view in the diagonal of the image surface, expressed in terms of degrees. Equation 4 defines the angle of view of the image pickup optical system within the adequate range. If the value of $2\omega$ is within the range defined by the Equation 4, it is possible to reduce the amount of driving the onboard camera or surveillance camera to be provided with the image pickup optical system in the panning and tilting mode.

The following conditional equation 4', instead of Equation 4, is more preferably fulfilled.

$$2\omega > 150 \qquad \text{Eq. 4'}$$

In the fourth lens with positive power, the stronger convex surface is preferably facing the image surface side than the surface facing the image pickup surface side.

Each of a plurality of lenses (L1 through L4) constituting the image pickup optical system 101 according to the present invention is a refractive lens that deflects the incident light by refraction. However, the available lenses are not restricted to them alone. For example, a diffractive lens that deflects the incident light by diffraction or a hybrid refractive/diffractive lens that deflects the incident light by a combination of diffraction and refraction may also be used alternatively.

Further, such an optical axis modification member as a prism and mirror may be provided along the optical path. Since the optical axis modification member bends the optical path extending from the object to the image surface, the image pickup apparatus provided with the image pickup optical system 101 can be downsized by bending the optical path properly.

The image pickup optical system according to the present invention can also be used in a visual telephone camera, door phone camera and a camera incorporated in an information processing system such a mobile computer and a portable information terminal.

EXAMPLES

Referring to construction data and aberration diagrams, the following provides more specific description of the structure of the image pickup optical system provided in the image pickup apparatus as an embodiment according to the present invention. Examples 1 and 2 to be explained below as examples correspond to the aforementioned first and second embodiments. The lens configuration diagrams (FIGS. 2 and 3) representing the first and second embodiments show the lens configurations of the corresponding to those in the Examples 1 and 2. In FIGS. 2 and 3, F1 is a low pass filter and F2 is the cover glass for forming the IR cut filter to protect the image pickup element behind which cover glass F2 is located.

In the construction data and aspherical surface data of Tables 1 through 4, the curvature radius is represented by "r" and numbers are assigned in the descending order starting from the side closest to the photographing object. The spacing on the axis is denoted by "d", and the spacing on the axis from the photographing object is given sequentially from the top of the Table. The refractive index and Abbe's constant are represented by N and ν, respectively, and the refractive index and Abbe's constant from the side closest to the photographing object are given sequentially from the top of the Table. Further, the refractive index and Abbe's constant are provided for line d. The refractive index and Abbe's constant for air are omitted. The aspherical surface is affixed with an asterisk (*) at the end of the surface number. The image pickup element is located on the rear of the final surface. The focal length of the entire system is set at 1.0 mm, and the curvature radius and spacing on the axis are given in units of mm.

The aspherical surface is defined by the following Equation 5.

$$X(H) = C \cdot H^2 / \{1 + (1 - \epsilon \cdot C^2 \cdot H^2)^{1/2}\} + \Sigma Ak \cdot Hk \qquad \text{Eq. 5}$$

where H denotes the height in the direction perpendicular to the optical axis, X(H) indicates the amount of displacement at height H in the direction of optical axis (whose origin is placed at the surface vertex). C represents the paraxial curvature, $\epsilon$ is the quadratic surface parameter, k is an order of aspherical surface, Ak is the k-th order of the aspherical surface coefficient, and Hk is H to the power of k. Tables 2 and 4 show the data of aspherical surfaces. Letter E affixed to the data Tables 2 and 4 shows the exponent portion of the corresponding numeral. For example, 1.0E-02 indicates $1.0 \times 10^{-2}$.

Figure 4:
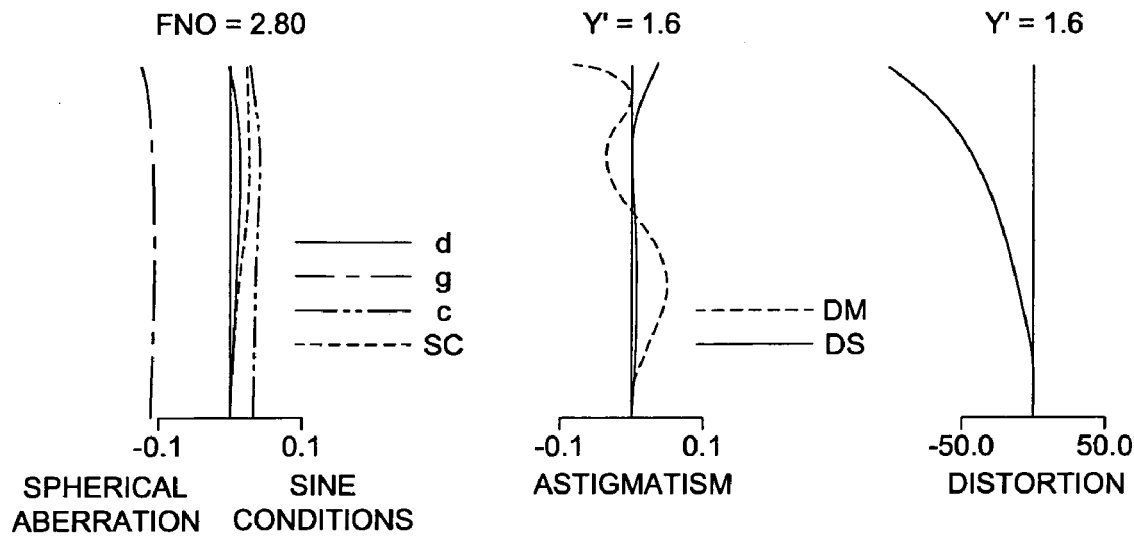
FIG. 4 is a diagram representing aberrations of an image pickup optical system as the first embodiment.
Figure 5:
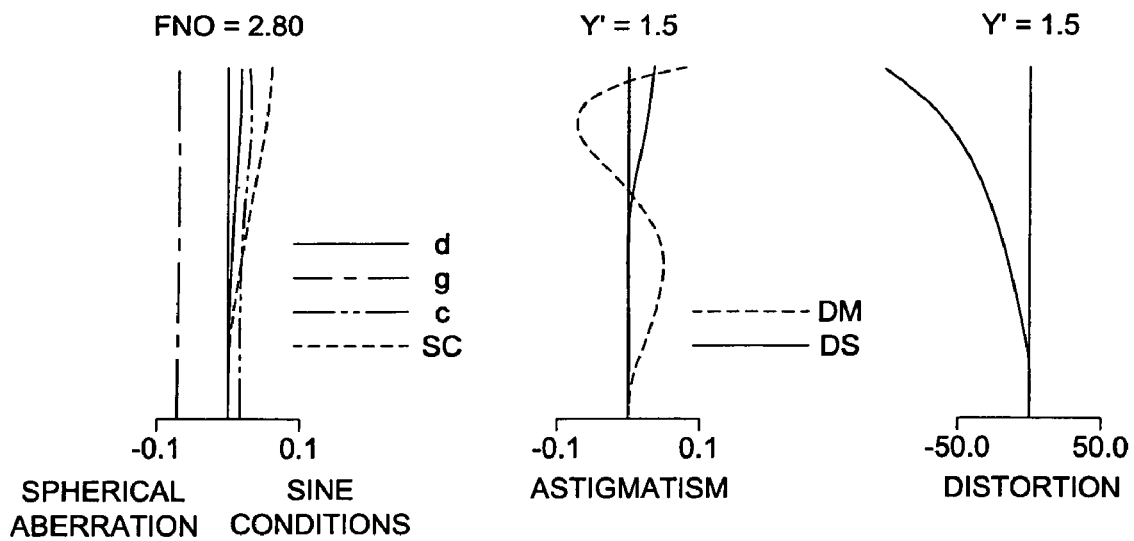
FIG. 5 is a diagram representing aberrations of an image pickup optical system as the second embodiment.

In the aberration diagrams in FIGS. 4 and 5, the line d in each spherical aberration diagram is the aberration for d line, line g is that for g line, and line c is that for c line. The line SC denotes an amount of the offence against the sine condition. The line DM and line DS of each astigmatism diagram indicate aberrations on the meridional surface and sagittal surface, respectively. They are represented in units of percentage only for the horizontal axis of distortion, and in units of mm for all other axes.

Table 5 shows the values of each of the Examples corresponding to conditional equations. All the Examples fulfill the conditional equations.

Example 1

TABLE 1

| Surface number | Curvature radius (r) | Spacing on axis (d) | Refractive index (N) | Abbe's constant (ν) |
|---|---|---|---|---|
| 1 | 33.63381 | 0.62999 | 1.77249 | 49.60 |
| 2 | 2.82026 | 1.86897 | | |
| 3* | −10.74864 | 0.55999 | 1.53048 | 55.72 |
| 4* | 1.94062 | 0.94499 | | |
| 5 | 3.54825 | 1.17598 | 1.80518 | 25.42 |
| 6 | −5.71192 | 0.90299 | | |
| 7 | ∞ | 0.89599 | | |
| 8* | 13.75076 | 1.07098 | 1.53048 | 55.72 |
| 9* | −1.38598 | 0.80416 | | |
| 10 | ∞ | 0.85399 | 1.546 | 59.20 |
| 11 | ∞ | 0.21 | 1.5255 | 58.60 |
| 12 | ∞ | | | |

TABLE 2

Aspherical surface data r3

$\epsilon$ = 1.00000
A4 = 0.34218217E−01
A6 = −0.31262495E−02
A8 = −0.36681060E−03
A10 = 0.93735651E−04 r4

$\epsilon$ = 1.00000
A4 = 0.64929823E−04
A6 = 0.40967634E−01
A8 = −0.22454456E−01
A10 = 0.40608674E−02 r8

$\epsilon$ = 1.00000
A4 = −0.90511761E−01
A6 = 0.59798747E−01
A8 = −0.25137363E−01
A10 = 0.41193885E−02 r9

$\epsilon$ = 1.00000
A4 = 0.77338867E−01
A6 = −0.85749292E−01
A8 = 0.76864636E−01
A10 = −0.12366457E−01

Example 2

TABLE 3

| Surface number | Curvature radius (r) | Spacing on axis (d) | Refractive index (N) | Abbe's constant (v) |
|---|---|---|---|---|
| 1 | 18.64395 | 0.51884 | 1.72916 | 54.67 |
| 2 | 2.39118 | 1.60459 | | |
| 3* | −4.56561 | 0.51884 | 1.53048 | 55.72 |
| 4* | 4.04117 | 0.89532 | | |
| 5 | −10.76378 | 0.92015 | 1.7859 | 43.93 |
| 6 | −1.72484 | 0.43796 | | |
| 7 | ∞ | 0.94098 | | |
| 8* | −4.88805 | 0.97305 | 1.53048 | 55.72 |
| 9* | −1.19585 | 0.74917 | | |
| 10 | ∞ | 0.79123 | 1.546 | 59.20 |
| 11 | ∞ | 0.19456 | 1.5255 | 58.60 |

TABLE 4

Aspherical surface data r3

ε = 1.00000
A4 = 0.15839176E+00
A6 = −0.29458494E−01
A8 = 0.12399661E−01
A10 = −0.45136915E−02 r4

ε = 1.00000
A4 = 0.85044469E−01
A6 = 0.75900920E+00
A8 = −0.99410758E+00
A10 = 0.82857573E+00 r8

ε = 1.00000
A4 = −0.18103517E+00
A6 = 0.18865280E−01
A8 = 0.20580995E+00
A10 = −0.28019987E+00 r9

ε = 1.00000
A4 = 0.10839222E+00
A6 = −0.22289569E+00
A8 = 0.26052088E+00
A10 = −0.82524062E−01

TABLE 5

Values corresponding to conditional equations

| | f2/f4 | vd3 | f/f2 | 2ω |
|---|---|---|---|---|
| Example 1 | −1.25 | 25.4 | −0.33 | 164° |
| Example 2 | −1.44 | 43.9 | −0.25 | 161° |

While the preferred embodiments of the present invention have been described using specific terms, such description is for illustrative purposes only, and it is to be understood that changes and variations may be made without departing from the sprit or scope of the appended claims.

What is claimed is:

1. An image pickup optical system for forming a light flux from an object into an optical image on an image pickup element, the image pickup optical system consisting of, in order from an object side thereof:
    a first lens with a negative power in a meniscus shape including a convex surface facing the object side;
    a second lens in a biconcave shape;
    a third lens with a positive power including a convex surface facing an image surface side; and
    a fourth lens with a positive power including a convex surface facing the image surface side,
    wherein the first lens and the third lens are glass lenses and the second lens and the fourth lens are plastic lenses.

2. The image pickup optical system as claimed in claim 1, wherein the image pickup optical system fulfills a following conditional formula:

$$-2 < f2/f4 < -0.5,$$

where f2 is a focal length of the second lens and f4 is a focal length of the fourth lens.

3. The image pickup optical system as claimed in claim 1, wherein the image pickup optical system fulfills a following conditional formula:

$$vd3 < 50,$$

where vd3 is an Abbe's constant of the third lens.

4. The image pickup optical system as claimed in claim 1, further comprising:
    a stop arranged between the third lens and the fourth lens.

* * * * *